United States Patent

Saunders

[11] 3,925,018
[45] Dec. 9, 1975

[54] METHOD AND APPARATUS FOR QUANTITATIVE ANALYSIS UTILIZING PARTICULATE REAGENT MATERIAL

[75] Inventor: Alexander M. Saunders, Bedford Village, N.Y.

[73] Assignee: Technicon Instruments Corporation, Tarrytown, N.Y.

[22] Filed: June 8, 1973

[21] Appl. No.: 368,406

[52] U.S. Cl. ....... 23/230 R; 23/230 B; 195/103.5 R
[51] Int. Cl.² .................. G01N 15/02; G01N 21/26; G01N 31/14; G01N 33/16
[58] Field of Search ......... 23/230 R, 253 R, 230 B; 356/102; 235/92 PC; 195/103.5 R

[56] References Cited
UNITED STATES PATENTS

| | | | |
|---|---|---|---|
| 2,379,158 | 6/1945 | Kalischer | 23/253 R X |
| 2,875,666 | 3/1959 | Parker et al. | 235/92 PC |
| 3,088,875 | 5/1963 | Fisk | 195/103.5 R |
| 3,247,078 | 4/1966 | Herrett | 195/103.5 R |
| 3,275,834 | 9/1966 | Stevens | 356/102 |
| 3,492,396 | 1/1970 | Dalton et al. | 23/230 B X |
| 3,794,467 | 2/1974 | Adams et al. | 23/230 B X |

OTHER PUBLICATIONS

K. Mosbach, Scientific American 224, 26 (1971).

*Primary Examiner*—Robert M. Reese
*Attorney, Agent, or Firm*—S. P. Tedesco; Stephen E. Rockwell

[57] ABSTRACT

Method and apparatus for quantitative analysis of a constituent of interest of a sample wherein the sample is reacted with a reagent in solution in the presence of a multitude of microholders which are suspended in the solution and each comprising a reagent different from the first-mentioned reagent, and determining a reaction product on the microholders as a measure of the constituent of interest. For the analysis of plural constituents of interest in a single portion of a sample, the microholders may be of plural types each having a distinguishing characteristic and each type comprising a different reagent for a particular constituent of interest. The microholders of each type are discriminated from each other during analysis for classification according to the constituents of interest.

5 Claims, 3 Drawing Figures

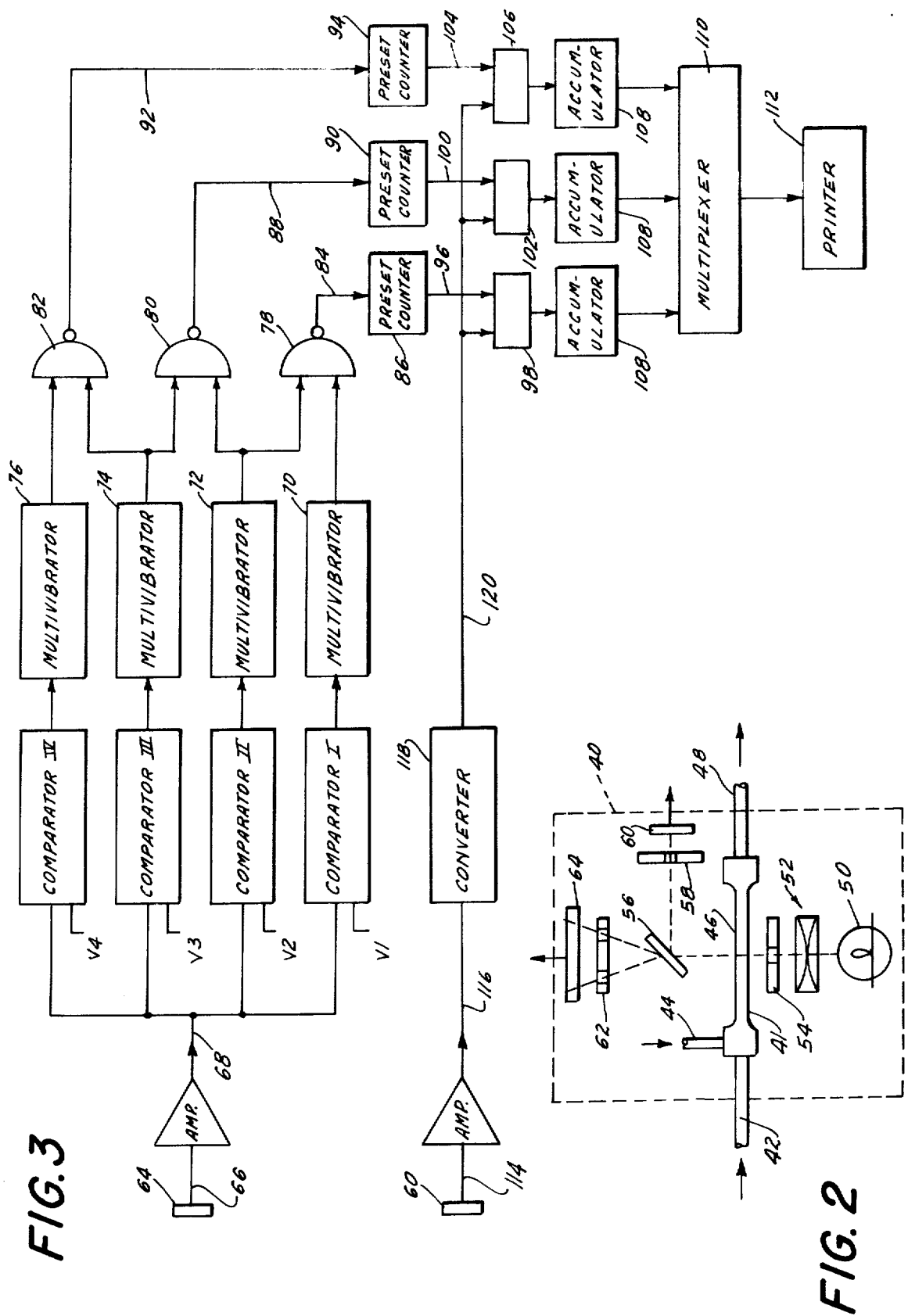

METHOD AND APPARATUS FOR QUANTITATIVE ANALYSIS UTILIZING PARTICULATE REAGENT MATERIAL

BACKGROUND OF THE INVENTION

1. Field of the Invention

This invention relates to automated wet-chemical analysis of a sample utilizing a multiplicity of microholders or microparticles each comprising a reagent.

2. Prior Art

Heretofore, automated analysis of liquid samples has been conducted in the presence of reagents all in the form of solutions, such as shown and described in Skeggs et al. U.S. Pat. No. 3,241,432 issued Mar. 22, 1966, wherein analysis is of the now well-known continuous-flow type and includes a plurality of different tests on different aliquots of each sample. In the apparatus of that patent, a dialyzer is employed in particular analyses to separate from a segmented stream of liquid samples, such as human blood, those constituents, such as proteins, which would otherwise interfere with the diffusion of the sample into the particular reagent in each one of numerous tests. Such dialysis requires a separate step in the method of analysis and equipment for carrying out the step. Such apparatus commonly employs a colorimeter for quantitative determination of a constituent of interest of the sample, involving a color reaction. The colorimeter, in effect, views a liquid volume in a flow cell and a determination is made at a particular wavelength, for a particular test reaction, for the degree of light absorbance or transmission as a quantitative measurement of the constituent of interest, all in accordance with well-known principles.

The prior art includes injecting a suspension of particles into a stream within a sheath stream of liquid flowing in the same direction for the passage of the particles one after another across a beam of light, utilizing a sheath stream flow cell, as described by P. J. Crosland-Taylor in A Device for Counting Small Particles Suspended in a Fluid through a Tube, Nature, page 37 (Jan. 3, 1953). Also, in the prior art, there are a method and apparatus for passing a suspension of particulates such as human cells in a narrow stream across a beam of light for detection and display of certain cell characteristics, as shown and described in Groner et al. U.S. patent application, Ser. No. 85,353, filed Oct. 30, 1970, now U.S. Pat. No. 3,740,143.

Further, heretofore, work in the field of binding enzymes to artificial matrixes to imitate the way enzymes are held in place in living cells, for study of enzyme reactions and for commercial production of compounds has been documented, as by Klaus Mosbach in Enzymes Bound to Artificial Matrixes, SCIENTIFIC AMERICAN, pages 26–33 (Mar., 1971). On page 31 of that article, there is described a semiquantitative biochemical analysis, developed by Howard H. Weetall and Norman Weliky of Jet Propulsion Laboratory, wherein the enzyme peroxidase is bound to cellulose in the form of a strip of paper. On the strip are deposited small amounts of a colorless dye and a solution suspected of containing peroxide. More or less of the dye is oxidized by the hydrogen peroxide in the presence of the enzyme peroxidase, depending on the amount of hydrogen peroxide present.

The present invention contemplates a continuous-flow type of quantitative analysis wherein a liquid sample, usually without dialysis, is diffused, together with a liquid reactant, into a multitude of particulates incorporating a reagent, which are passed in suspension in a sheathed stream across a beam of light for detection and measurement of a reaction product on the particulates, quantitatively indicating the constituent of interest of the sample. The advance over the prior art resides, in part, in that such particulates present a greater surface area for diffusion of the sample thereinto and more complete interaction of the sample and reagent solution with the reagent incorporated in the particulate matter. The particulates may consist of artificial matrixes to which the included reagent, an enzyme for example, may be bound. This analysis technique permits greater sensitivity of analysis in that it makes possible analysis of one constituent of low concentration, or plural constituents of interest of a sample concurrently in the presence of each other in a single hydraulic channel. Many test reactions may be carried out in accordance with the technique and the technique is flexible in its applications. For example, utilizing such particulate reagents an unstable intermediate, such as glutathione, may be generated in one reaction as a product and utilized immediately as a substrate for a following enzyme reaction. Moreover, biologic cells may be utilized as particulates incorporating a reagent, and cells from tissue cultures incorporating small but substantially constant amounts of special enzymes may be utilized for analysis of their specific substrates.

SUMMARY OF THE INVENTION

One object of the invention is to provide an improved method and apparatus for continuous-flow analysis. Another object is to provide a method and apparatus for analysis of a constituent of interest of a sample wherein the sample is reacted with a reagent in solution in the presence of a multitude of microholders which are suspended in the solution and each comprising a reagent different from the first-mentioned reagent, and determining a reaction product on the microholders as a measure of the constituent of interest. For the analysis of plural constituents of interest of the same sample, the microholders may be of plural types each having a distinguishing characteristic and each type comprising a different reagent for a particular constituent of interest. The microholders of each type are discriminated from each other during analysis for classification according to the constituents of interest.

BRIEF DESCRIPTION OF THE DRAWINGS

In the drawings:

FIG. 2 is a schematic view of the flow cell and optics of the apparatus of FIG. 1; and FIG. 3 is an electrical diagram of the apparatus.

DETAILED DESCRIPTION OF THE PREFERRED EMBODIMENT

Figure 1:
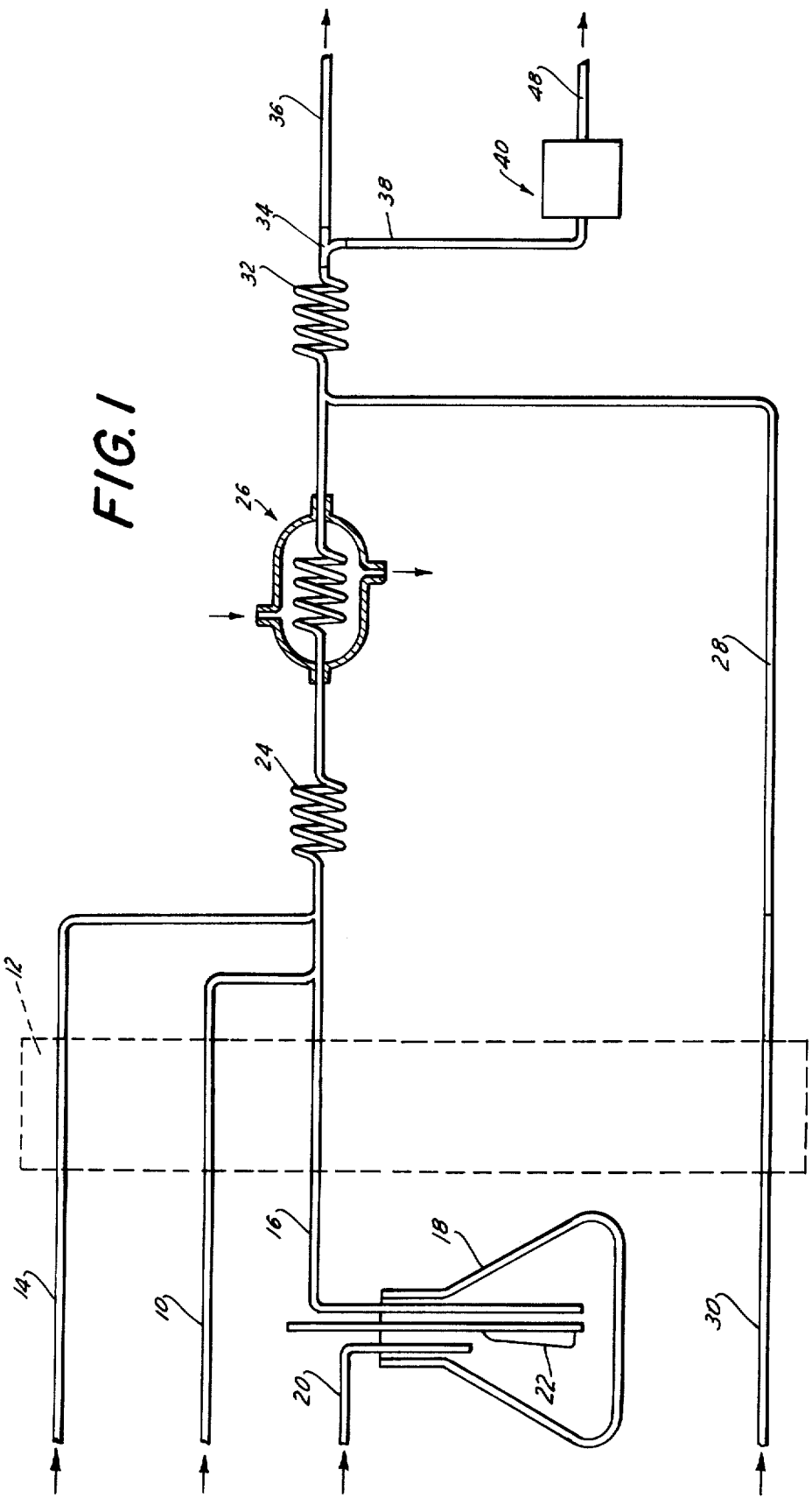
FIG. 1 is a schematic view of analysis apparatus embodying the invention.

Referring now to the drawings in detail and first especially to FIG. 1, the apparatus comprises a compressible pump tube 10 for supplying a series of liquid samples one after another from a sample source, not shown, such as a sampler of the type shown and described in U.S. Pat. No. 3,038,340 issued June 12, 1962. The pump tube 10 is incorporated in a proportioning pump 12 which may be of the type shown and described in U.S. Pat. No. 2,935,028 issued May 3, 1960. The nonillustrated sampler segments the sample stream with air segments in a manner such that each sample is isolated from its neighbor in the sample stream by an air segment in accordance with the operation of the aforementioned sampler. The samples flowing in such stream are different liquid samples such as for example, specimens of blood or blood serum taken from different patients for treatment and analysis thereof with respect to a plurality of substances therein as for example in the present illustrative example of blood or blood serum; glucose, uric acid and ascorbic acid. It is to be understood that the present invention may be used for the determination of the quantities of any number of substances which are present in a liquid sample.

The air-segmented sample stream caused to flow in pump tube 10 is treated, during its flow, for quantitative analysis with respect to the above-mentioned substances so that the sample may be analyzed by light absorption techniques for example. For these purposes, the sample stream is transmitted in pump tube 10 by the action of the pump 12 to a junction where an inert gas stream, simultaneously transmitted through pump tube 14, is added to the sample stream to segment it further with gas segments. To this combined stream is added through a junction a reagent stream flowing in pump tube 16.

For illustrative purposes only, the reagent stream flowing through pump tube 16 is supplied through a flask 18 containing in solution a colorless reagent or chromogen such as 4-chloro-1-napthol. Suspended in the solution in the flask 18 are a multitude of microholders or particles of three different types for example, each type having a characteristic by which it may be distinguished from the other types. In the present example, this distinguishing feature is the size of each type of particle. For illustrative purposes only, the size of one type of particle may be 5.0 microns, the second type may be 10.0 microns and the third type may be 15.0 microns. The particles of each type may vary somewhat in size but not to the extent that the particles of one type become confused with the particles of another type as to size. The particles of the different types carry different reagents incorporated therein and reagents different from the reagent in solution in the flask 18.

Particles useful in analysis in general in the practice of the invention fall into one of two classifications. In one classification are particles having a "backbone" or carrier for the included reagent which reagent may be bound to the carrier by a covalent or an ionic binding, or the carrier may be a gel matrix in which the reagent is embedded. The other of the two classifications of the particles may consist of aggregates of molecules including the reagent, and as such the last-mentioned particles are not considered as having a backbone or carrier. In general, particles of both classifications are characterized in that they are insoluble in aqueous solutions and porous to water and small solutes. Some may be impervious to large molecular weight solutes while others may be capable of retaining large molecular weight solutes and precipitates. Such particles are further characterized in general as being transparent when suspended in aqueous solutions and having a specific gravity close to that of water. Also in general the particles are characterized by concentrating the products of a reaction thereon, such as a dark precipitate or colored substance, for optical analysis of such products. Generally such particles are spherical in shape.

Particles or microholders in the class of those that include a carrier may have a carrier selected in accordance with the reagent to be carried and the chemical reactions involved as well as other considerations from a group including dextran, gels, acrylic polymers, polyamino acids, cellulose, glass, polystyrene and starch. Particles of microholders of the aforementioned type not having a backbone or carrier may be formed for example of enzyme molecules using bifunctional compounds to cross-link them into large aggregates, as well as a number of other substances.

In the analysis of the aforementioned constituents of interest in a single sample such as glucose, uric acid and ascorbic acid, the particles utilized in analysis may be of the type having a size characteristic by which each type may be distinguished from the others and all three types of particles utilized may include a backbone or carrier formed of polyacrylamide for example. All the reagents bound to such carriers may have a covalent type of binding to the carriers. To all the carriers of the size group of 5.0 microns are bound the reagents glucose oxidase and horseradish peroxidase for the determination of the glucose constituent of interest of the sample, which is a test used in diagnosis and management of diabetes or other conditions. To all the carriers in the size group of 10.0 microns are bound the reagents uricase, i.e., uric acid oxidase, and horseradish peroxidase for the uric acid constituent of interest of the sample, which is a test used for diagnosis and management of gout. To the carriers of the particles in the size group of 15.0 microns are bound the reagents ascorbic acid oxidase and horseradish peroxidase for the ascorbic acid constituent of interest in the sample, which is a measure of nutritional status, especially of vitamin C deficiency. The presence of molecular oxygen in solution is required for each of the above tests. The required concentration is assured by the air segments of the sample stream.

The reagent suspension in the flask 18 is supplied from a source, not shown to the flask in any convenient manner which may include a conduit 20 having an outlet within the flask. The particles or microholders in suspension in the flask 18 are maintained in suspension as by a stirrer blade 22 driven in any suitable conventional manner not shown. The reagent stream flowing in pump tube 16 after being combined with the segmented sample stream as aforesaid enters a mixing coil 24 and the combined stream has an output from the coil 24 to a temperature-controlled incubator 26. The stream outletted from the incubator has a junction with a diluent stream in a conduit 28 supplied by a pump tube 30 in the pump 12 which tube has an inlet end connected to a source of diluent not shown. From the last-mentioned junction the diluted stream flows through a mixing coil 32 which re-suspends the particulate reagents, and the stream flows from the mixing coil 32 to a junction 34 wherein the stream is debubbled in a conventional manner and the gas is removed through a conduit 36 in a conventional manner which conduit 36 is to waste. The remaining liquid stream passes from the junction 34 through conduit 38 to the treated sample inlet of a unit, indicated generally at 40, including in the illustrated form a sheath-stream flow cell and optics.

The sheath-stream flow cell 41 (FIG. 2) may be of the type illustrated and described in U.S. Pat. No.

3,661,460 issued May 9, 1972 and need not be described in detail here. The flow cell 41 has a treated sample inlet 42 and an inlet for a sheath stream, the last-mentioned inlet being indicated at 44. The sheath stream is supplied from a non-illustrated source to the flow cell wherein the treated sample stream is narrowed within a viewing area 46 of the cell so that the aforementioned particles in the stream pass essentially one after another through the viewing area 46 across a beam of light incident on the stream. The stream, passing from the flow cell through a conduit 48, is caused to flow through the conduit 48 to waste or collection as desired.

As indicated in FIG. 2, the aforementioned beam of light has its origin in a lamp 50 and light from the lamp 50 passes through condenser lens assembly 52 and thence through a centrally apertured stop 54 for incidence on the treated sample stream within the viewing area 46 of the flow cell. The beam of light after irradiating the sample stream is directed upon a dichroic mirror 56 which acts as a beam splitter and directs a portion of the beam at an absorption wavelength through a centrally apertured field stop 58 to impinge upon a photodiode 60 responsive to such wavelength and which photodiode is hereinafter referred to as the absorption detector. As shown in the last-mentioned view, the portion of the beam which passes through the beam splitter 56 at a light scattering wavelength is directed through a reticule 62 forming a dark field stop to impinge upon a photodiode 64 responsive to such scatter wavelength and which photodiode is hereinafter referred to as the scatter detector.

Returning now to the hydraulic portion of the apparatus, particularly to the incubator 26, shown in FIG. 1 for the purpose of explaining the chemical reactions which take place therein with reference to the multiple analysis under discussion, the glucose constituent of the blood sample forms, in the presence of the glucose oxidase reagent carried by the particles in the 5.0 microns size, hydrogen peroxide and other products. The hydrogen peroxide, in the presence of the horseradish peroxidase reagent carried by the last-mentioned particles enters a second reaction with the 4-chloro-1-naphthol as chromogen, which gives a dark water-insoluble precipitate having a high extinction coefficient and water. The aforementioned peroxidase reagent is supplied in excess by these particles so that the amount of the dark precipitate which is formed in these particles is measurable by the absorption detector 60 as a quantitative indication of the glucose substrate of the reaction, which is the constituent of interest. Concurrently with the light absorption optical reactions of these particles which result in actuation of the absorption detector 60, light scattering optical reactions of these particles in accordance with their size register on the scatter detector 64 enabling recognition of these particles by their size.

The uric acid constituent of the blood sample forms, in the presence of the enzyme reagent uricase or uric acid oxidase carried by the particles in the 10.0 microns size, hydrogen peroxide and other products. The hydrogen peroxide product of this reaction enters a second reaction in the presence of the bound enzyme reagent horseradish peroxidase of these particles, together with the 4-chloro-1-naphthol as chromogen, which gives a dark insoluble precipitate and water. The amount of the dark precipitate which is formed on these particles is measurable by the absorption detector 60 (FIG. 2) as a quantitative indication of the uric acid substrate of the reaction, which is the constituent of interest. Again, concurrently with the light absorption optical reactions of these particles which result in the actuation of the absorption detector 60, light scattering optical reactions of these particles in accordance with their size register on the scatter detector 64 enabling recognition of these particles by their size.

The ascorbic acid constituent of the blood sample forms, in the presence of the enzyme reagent ascorbic acid oxidase carried by the particles in the 15.0 microns size, hydrogen peroxide and other products. The hydrogen peroxide, in the presence of the horseradish peroxidase reagent carried by the last-mentioned particles, enters a second reacton with the 4-chloro-1-naphthol, which gives a dark insoluble precipitate and water. The amount of the dark precipitate which is formed on these particles, and which is the same dark precipitate which is the product of the previously described reactions is measurable by the absorption detector 60 as a quantitative indication of the ascorbic acid of the reaction, which is the constituent of interest. As before, concurrently with the light absorption optical reactions of these particles which result in actuation of the absorption detector 60, light scattering optical reactions of these particles in accordance with their size register on the scatter detector 64 enabling recognition of these particles by their size.

While not required, it is advantageous, as in the particular analysis under discussion, to perform simultaneous reactions in the presence of each other for the determination of plural constituents of interest of the sample. It is also advantageous, as in the given analyses, that in each reaction there is a common product such as hydrogen peroxide and that the product which is measured which is the dark precipitate in the aforementioned example, is common to all the reactions. In this connection, note that each of the three different size types of particles carries a common reagent in the foregoing example, namely the horseradish peroxidase. Such common factors obviate problems which might otherwise be present as in different pH environments and different sample diffusion and reaction rates.

It will be understood from the foregoing, that the reagent particles or microholders of the three different size types pass through the viewing area 46 of the flow cell 40 in random relationship to one another. Turning now to FIG. 3, and signal processing for discriminating reagent particles in the 5.0 microns, 10.0 microns and 15.0 microns size types, energization of the scatter detector 64 generates a signal along lead 66 which has an input to an amplifier. The output from the amplifier along lead 68 is connected to the respective inputs of threshold comparators I–IV. Comparator I has an input reference voltage V1 which is lower than the reference input voltage V2 of comparator II. Reference input voltage V3 of comparator III, higher than reference voltage V2, is lower than input reference voltage V4 of comparator IV. Amplified voltage signals derived from particles of the 5.0 microns type fall intermediate reference voltages V1 and V2, amplified voltage signals derived from particles of the 10.0 microns type fall intermediate reference voltages V2 and V3, and amplified voltage signals derived from particles of the 15.0 microns type fall intermediate reference voltages V3 and V4.

Comparator I has an output to an input of a one-shot multivibrator 70, and comparator II has an output to an input of one-shot multivibrator 72. Comparator III has an output to an input of one-shot multivibrator 74, and comparator IV has an output to an input of one-shot multivibrator 76. Multivibrator 70 has an output to one input of NAND gate 78. Multivibrator 72 has an output to the other input of NAND gate 78 and an output to one input of NAND gate 80. Multivibrator 74 has an output to the other input of NAND gate 80 and an output to one input of NAND gate 82. Multivibrator 76 has an output to the other input of NAND gate 82.

The output from NAND gate 78 is connected along lead 84 to the input of a preset counter 86 for counting the particles passing through the viewing area 46 of the flow cell of the 5.0 microns type. NAND gate 80 has an output along lead 88 to an input of a preset counter 90 for counting the particles passing through the viewing area of the flow cell of the 10.0 microns type. NAND gate 82 has an output along lead 92 to an input of a preset counter 94 for counting the particles passing through the viewing area of the flow cell of the 15.0 microns type. The preset counters 86, 90 and 94 may all be preset to the same value, say, 10,000 for example.

Whenever counter 86 counts a particle, an output is generated from the counter along lead 96 to one input of data transmission gate 98. Similarly, whenever counter 90 is energized to count a particle the counter generates an output signal along lead 100 to one input of data transmission gate 102. Also similarly, whenever the counter 94 counts a particle, the counter generates an output signal along lead 104 to one input of data transmission gate 106.

As indicated in FIG. 3, gates 98, 102 and 106 are enabled by signals from the preset counters 86, 90 and 94, respectively. The outputs of the respective gates 98, 102 and 106 are to respective inputs of respective ones of accumulators 108. The outputs of the respective accumulators 108 along suitable cables are connected to respective inputs of a multiplexer 110 which has an output to an input of a printer 112 for display of total absorption values derived from the absorption detector 60 responsive to the quantity of the reaction products carried by the 10,000 counted particles of each of the three different size types viewed in the area 46 of the flow cell on passage therethrough, which display is separated into three parts each quantitatively indicating one constituent of interest.

Turning now to the processing of signals from the absorption detector 60 as shown in FIG. 3, the absorption detector 60 generates a signal along lead 114 to an input of an amplifier. The amplified signal along lead 116 is passed to an A/D converter 118 which converts the amplitude of such signal to a binary number passed along lead 120. The lead 120 is connected to each of the other inputs of gates 98, 102 and 106, respectively. The corresponding ones of the multivibrators 70, 72, 74 and 76, previously described cooperating with the gates 98, 102 and 106, serve to hold the corresponding ones of the last mentioned gates open sufficiently long, say 20 microseconds, for the binary number quantitatively indicating the reaction product on the particle in the viewing area to register in the corresponding accumulator 108. It is to be understood that the particular particle, located in the view area of the flow cell, carrying the reaction product actuates the appropriate one of the preset counters 86, 90 and 94 and that this counter enables only one of the data transmission gates for passage therethrough of the binary number from the lead 120, for registration of the data in the corresponding one of the accumulators 108. The interval of time that the last-mentioned data transmission gate is maintained open by the multivibrator action is less than the interval between passage of two neighboring particles through the beam of light.

The operation of the signal processing shown in FIG. 3 described above will be evident from the foregoing. For example, a particle of the 10.0 micron size type in the viewing area 46 of the flow cell irradiated by the beam of light and carrying a specific amount of the dark precipitate in accordance with the aforementioned reaction indicative of the uric acid constituent of interest, simultaneously energizes the absorption photodetector 60 and the scatter photodetector 64. The amplified scatter signal along lead 68 energizes comparators I and II, but not comparators III and IV, as the amplified voltage falls intermediate reference voltages V2 and V3. Comparators I and II energize the multivibrators 70 and 72 by which action NAND gate 80 is open for passage of a signal along lead 88 but NAND gate 78 remains closed. The signal along the last-mentioned lead activates counter 90 to register the particle in the viewing area of the flow cell and a signal is generated along the lead 100 from the output of the present counter 90 to one input data transmission gate 102. Simultaneously, the amplified signal on lead 116, which signal originated with the absorption photodetector 60, has an input to the A/D converter 118 which is converted thereby to a binary number in accordance with the amplitude of the signal. The binary number is passed along the lead 120 from the output of the converter. While data transmission gate 102 is enabled by a signal along lead 100 to one input thereof, the binary number along lead 120 passes gate 102 for registration of the binary number in the corresponding accumulator 108 which is scanned by the multiplexer 110 which energizes the printer 112 which prints out the total absorption value of the constituent of interest as represented by the 10,000 count of the particles in the 10.0 micron size type. It will be understood that in like manner the particles of the 5.0 and 15.0 microns size types are counted in the counters 86 and 94, respectively, and that the total absorption values of the completed counts of the particles of each of the last-mentioned types are printed out by the printer 112. While light absorption has been described as the utilized technique of analysis for the constituents of interest, it will be appreciated that fluorescence is also an available analysis technique.

Another example of multiple simultaneous analyses in a common hydraulic channel is one in which glucose and glycine are the constituents of interest and the sample is suspected of containing free hydrogen peroxide. Three distinguishable types of particles incorporating reagents are utilized, suspended in a solution of a different reagent, such as the last-named chromogen. One of the last-mentioned types of particles incorporates as a reagent peroxidase, another incorporates as reagents glucose oxidase and peroxidase and the third incorporates glycine oxidase and peroxidase as reagents. The reactions of glucose with glucose oxidase and glycine with glycine oxidase both give hydrogen peroxide as a product.

This product and the free hydrogen peroxide of the sample react with the peroxidase of all three types of particles to give a common dark precipitate in different amounts on the three types of particles. As the hydrogen peroxide generated by the aforementioned reactions is in the microenvironment of the particles of the second and third types, that is, in the presence of the peroxidase thereof, substantially all of the hydrogen peroxide product of the reactions is converted to the dark precipitate on these particles. Any amount of such generated hydrogen peroxide which diffuses into solution is so small as to be neglible in the total volume of the solution. Therefore, when the total absorption value for the completed count of the type of particle incorporating only peroxidase as a reagent, indicative of the free hydrogen peroxide in the sample, is subtracted from each of the total absorption values of the other two type particles, true absorption values for the two constituents of interest are obtained.

Similarly, where the activity of the enzyme amylase in blood is of interest for example, excess glucose in the sample, which is an interferent with the reaction of the enzyme amylase and its substrate present in the reaction, may be broken down into non-interfering substances by reacting such glucose with particles incorporating glucose oxidase.

Enzymes employed as reagents in particles for similar types of analyses are useful for determining their inhibitors present, for example, in the human body. Trypsin inhibitor, which is decreased in enphysema, is prognostic for that disease. Hyaluronidase inhibitor is elevated in specific diseases.

The method and apparatus may be employed for assays of antigens or antibodies. For example, different antigens, each with the same proteins collectively known as complement, may be incorporated in different size type particles. Specific antibodies will complex with the specific antigen in one or another of the particles. This complex further reacts with complement activating the latter for its enzyme function. Of course, not all antibodies will activate the same antigen. However, plural known types of antibody-antigen complexes will activate the same complement. Complement contains an inactive enzyme which is considered a reagent. The particles are suspended in a solution containing alpha naphthyl acetate, for example, a substrate for the complement enzyme and azo coupler. The different antigens combine with any of their specific antibodies present in the sample, and in a chain reaction activate the complement incorporated in those reagent particles in which an antigen-antibody comples is formed. In the presence of the activated enzyme of such particles, the substrate alpha naphthyl acetate is broken down, producing alpha napthol which reacts with the azo coupler to produce for detection a water-insoluble precipitate on such particles on which the antigen-antibody complex was formed.

It has been stated that the distinguishing characteristic of multiple types of reagent particles used in the presence of each other for multiple concurrent analyses in a single hydraulic channel may be the size of the particle types. Alternatively, other distinguishing characteristics are useful for particle type discrimination with appropriate optics and signal processing, such as by color coding the different types of reagent particles, for example.

Moreover, as will be obvious from the foregoing, if the analysis should be for a single constituent of interest, for example, and involve a color reaction, the reaction product of the sample with the employed microholder reagent or reagents may be or may not be soluble. In the former event, the reaction can be analyzed colorimetrically for example.

While only one form of the invention has been illustrated and described herein, it will be apparent, especially to those versed in the art, that the invention may take other forms, and that the method and the apparatus are susceptible of various changes in details without departing from the principles of the invention.

What is claimed is:

1. A method of analysis of plural constituents of a sample, comprising:
   reacting the sample in the presence of a multitude of microholders suspended in a liquid, each microholder comprising a reagent, the reagent of certain of said microholders being different from the reagent of certain other microholders, and
   determining products of reactions of said sample with said microholders as indications of the constituents.

2. A method as defined in claim 1, wherein: said different reagents of said microholders are on microholders of different types, each microholder type having a different color by which it may be discriminated from the other types, and further including the step of discriminating said microholder types on the basis of their color, and said determining of said products of reactions includes determining reaction products on said microholders of said types.

3. A method as difined in claim 1, wherein: said different reagents of said microholders are on microholders of different types, each microholder type having a different size by which it may be discriminated from the other types, and further including the step of discriminating said microholder types on the basis of their size, and said determining of said products of reactions includes determining reaction produces on said microholders of said types.

4. A method as defined in claim 3 wherein: said discrimination of said microholder types and the measuring of reaction products on said microholders includes flowing the reacted microholders in a stream in said viewing area across a beam of light which sequentially irradiates said microholders, sensing with a photodetector each irradiated microholder for the size thereof, and concurrently sensing with a photodetector the reaction product of each microholder.

5. A method as defined in claim 4; further including counting said microholders according to type in separate counters preset for a same count, the total count of each of said counters being separately related to the determination of the reaction product of the corresponding microholder type.

* * * * *